United States Patent [19]

Benker et al.

[11] Patent Number: 5,324,692
[45] Date of Patent: Jun. 28, 1994

[54] PROCESS FOR PRODUCING MOLDINGS FROM SILICON-INFILTRATED SILICON CARBIDE

[75] Inventors: Werner Benker, Selb; Juregen Schmidt, Marktredwitz, both of Fed. Rep. of Germany

[73] Assignee: Hoechst CeramTec Aktiengesellschaft, Selb, Fed. Rep. of Germany

[21] Appl. No.: 19,194

[22] Filed: Feb. 17, 1993

Related U.S. Application Data

[63] Continuation-in-part of Ser. No. 741,340, Aug. 7, 1991, abandoned, and a continuation-in-part of Ser. No. 741,343, Aug. 7, 1991, abandoned, and a continuation-in-part of Ser. No. 741,344, Aug. 7, 1991, abandoned.

[30] Foreign Application Priority Data

Aug. 9, 1990 [DE] Fed. Rep. of Germany ....... 4025235
Aug. 9, 1990 [DE] Fed. Rep. of Germany ....... 4025238
Aug. 9, 1990 [DE] Fed. Rep. of Germany ....... 4025239

[51] Int. Cl.$^5$ ............................................. C04B 35/65
[52] U.S. Cl. ........................................ 501/88; 501/90; 164/97; 164/98; 264/57; 264/65
[58] Field of Search ............... 264/57, 60, 65; 164/97, 164/98; 501/88, 90

[56] References Cited

U.S. PATENT DOCUMENTS

| | | | |
|---|---|---|---|
| 3,495,939 | 2/1970 | Forrest | 23/208 |
| 4,154,787 | 5/1979 | Brown | 264/60 |
| 4,265,843 | 5/1981 | Dias et al. | 501/90 |
| 4,564,496 | 1/1986 | Gupta et al. | 501/88 |
| 4,572,848 | 2/1986 | Pollak et al. | 427/294 |
| 4,626,516 | 12/1986 | Morelock | 501/92 |
| 5,079,195 | 1/1992 | Chiang et al. | 501/92 |

FOREIGN PATENT DOCUMENTS

| | | |
|---|---|---|
| 1092793 | 1/1981 | Canada . |
| 0134254 | 3/1985 | European Pat. Off. . |
| 0372708 | 6/1990 | European Pat. Off. . |
| 1671180 | 1/1980 | Fed. Rep. of Germany . |
| 2910628 | 1/1980 | Fed. Rep. of Germany . |
| 3719606 | 12/1988 | Fed. Rep. of Germany . |
| 0021943 | 5/1985 | Japan . |
| 1023155 | 3/1966 | United Kingdom . |

OTHER PUBLICATIONS

Chemical Abstract, vol. 110, (1989), p. 332, 198040u.

*Primary Examiner*—Karl Group
*Attorney, Agent, or Firm*—Foley & Lardner

[57] ABSTRACT

For silicizing porous moldings of silicon carbide/carbon, a mixture of silicon carbide powder, organic binder and, if appropriate, carbon is molded to give a green compact, the binder of the green compact is removed by carbonization at about 1000° C. in a non-oxidizing atmosphere and the resulting blank is silicized by the action of molten silicon, while the resulting blank rests on a porous SiSiC carrier, whose lower part is in contact with the molten silicon. The carrier used may be a close packing of porous SiSiC rings which are arranged mutually parallel and perpendicularly on a graphite firing plate which is charged with silicon and is impermeable to molten silicon; or the carrier may be plane having a plurality of recess; or the carrier may have a straight channel with an angular cross section and recesses, into which the blank to be silicized is placed, wherein the SiSiC carrier has downward protruding side walls, whose undersides are in contact with the molten silicon.

39 Claims, 7 Drawing Sheets

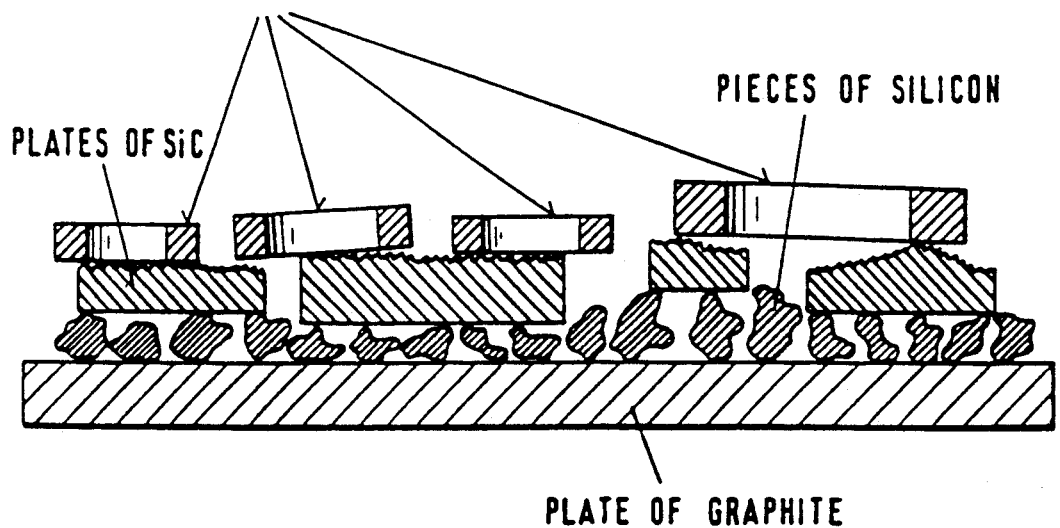
FIG. IA
PRIOR ART
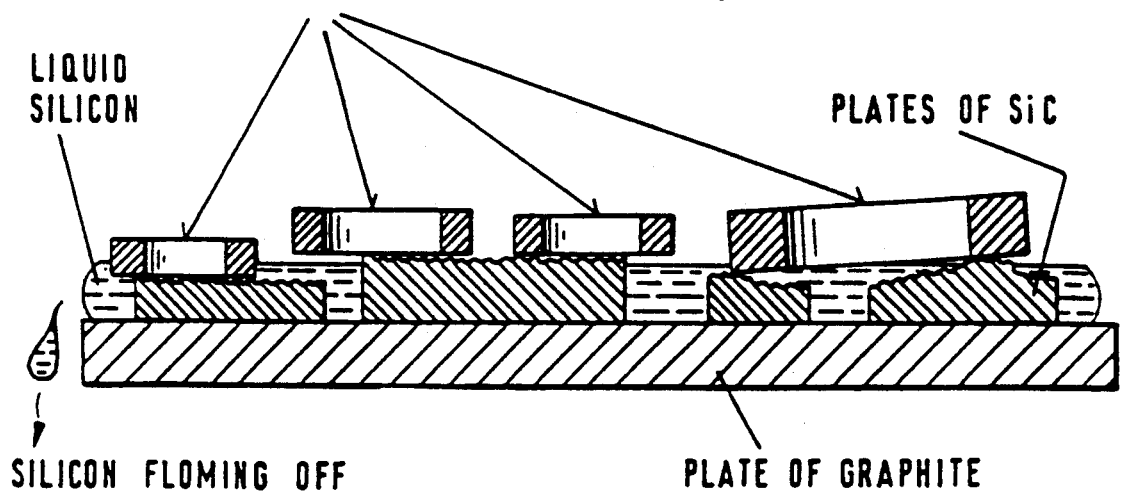
FIG. IB
PRIOR ART

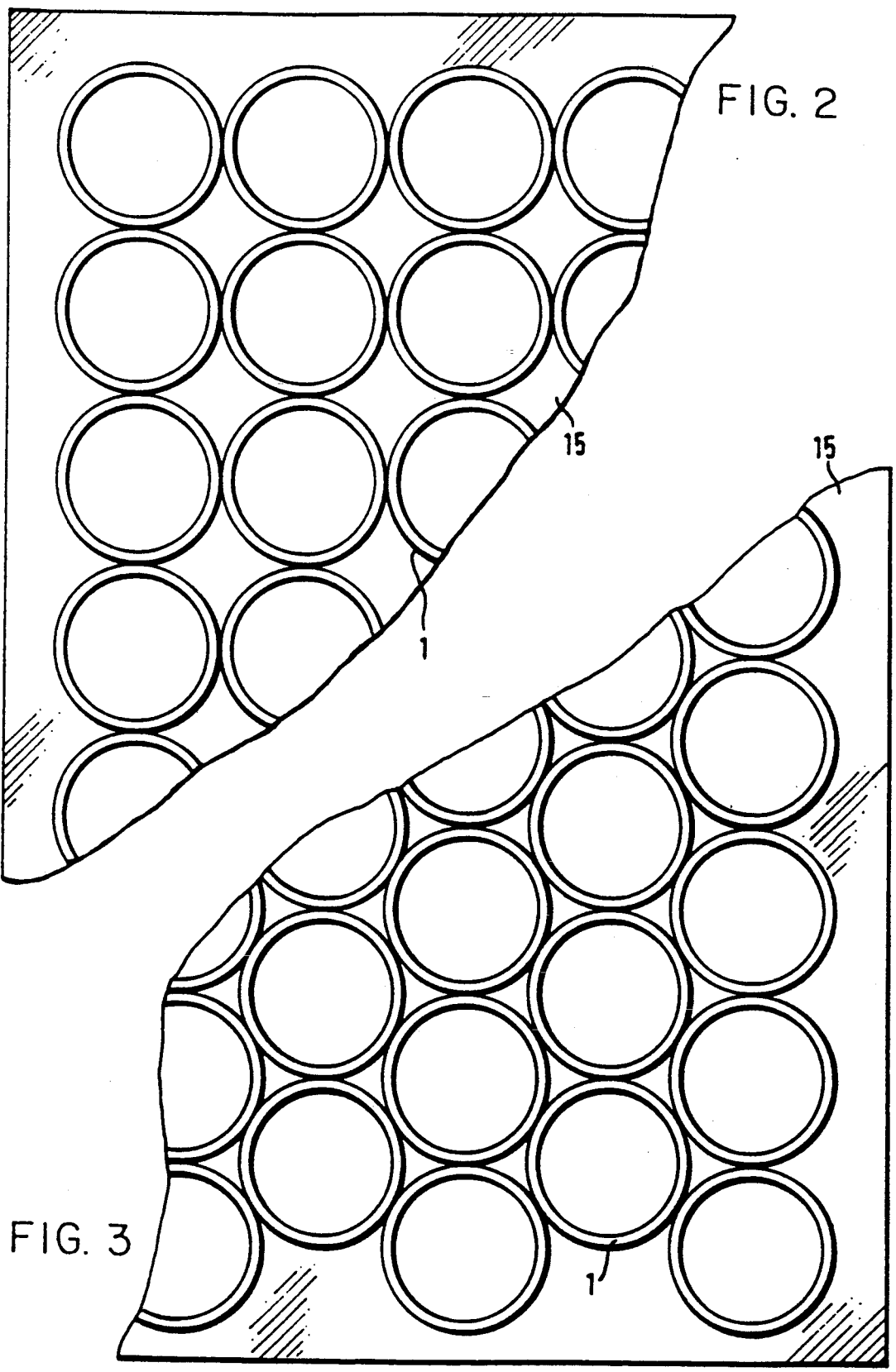

PROCESS FOR PRODUCING MOLDINGS FROM SILICON-INFILTRATED SILICON CARBIDE

This application is a continuation-in-part of Ser. Nos. 07/741,340, filed Aug. 7, 1991; 07/741,343, filed Aug. 7, 1991; and 07/741,344, filed Aug. 7, 1991. Each of these three applications is now abandoned.

BACKGROUND OF THE INVENTION

1. Field of the Invention

The invention relates to a process for silicizing porous moldings of silicon carbide/carbon, using a close packing of porous silicon-infiltrated silicon carbide rings, as an infiltration aid.

The invention further relates to a process for silicizing porous moldings of silicon carbide/carbon, having a plane outer surface, using a porous, plane carrier which is composed of silicon-infiltrated silicon carbide and has recesses.

The invention further relates to a process for silicizing porous, elongate, cylindrical moldings of silicon carbide/carbon, using a porous carrier which is composed of silicon-infiltrated silicon carbide and has a channel for receiving the molding.

2. Description of the Related Art

In the infiltration of silicon carbide moldings with silicon, zones of particularly high silicon content, so-called silicized tracks, and in addition not fully silicized components frequently form. Both these phenomena cause waste and hence are desired to be avoided.

According to the process of EP 134,254, the infiltration of the silicon carbide/carbon molding takes place via a porous silicon carbide plate which is provided with a coating of boron nitride, silicon carbide and carbon. Underneath the silicon carbide plate and, if appropriate, to the side thereof, there is (before the furnace is heated up) lumpy elemental silicon.

It has been found, however, that the use of plate-shaped SiSiC infiltration aids has disadvantages. In particular, when the silicon, which is located between the firing plates and the silicon carbide plates used as infiltration aids, has melted, the plates sink due to gravity through the silicon (which has a lower density) and displace the latter. Due to the surface tension, silicon facings of up to 5 mm in height can form on the firing plate. If, after the silicon carbide plates used as infiltration aids have sunk through, a higher facing were to form, this would cause the silicon to run off the plate (FIGS. 1a and b). Since the quantity of silicon provided on the firing plate is such that it is just sufficient to infiltrate completely the components located thereon and also to compensate for evaporation losses, the run-off of silicon leads to incomplete infiltration of at least some components. A precautionary extra provision of silicon on the firing plate is ruled out, since otherwise the components are joined after cooling so firmly to the infiltration aid that detachment without damage is impossible. If the silicon runs from one firing plate to a plate located below, it will cause sticking on the latter.

As mentioned above, the silicon level rises due to sinking of the SiSiC plates into the molten silicon. This can have the result that, when too low plates are used, the components come into direct contact with the molten silicon. This leads to inhomogeneous infiltration and to the occurrence of stresses in the component, which frequently manifests itself by formation of cracks. The resulting cracks are filled with silicon and are visible as silicized tracks in the component. It might be possible to prevent this effect by a reduction in the quantity of silicon per firing plate or by increasing the thickness of the silicon carbide plates. However, both possibilities adversely affect the economics of the process.

The process described, using SiSiC plates, is also used for silicizing blanks which have at least one plane supporting surface.

Because of the small thickness of the porous carrier plate used, and the small distance from the molten silicon, however, it was difficult to achieve homogeneous silicization.

By means of the process indicated in German Offenlegungsschrift 3,719,606, wherein the porous SiC plate is arranged on a container for molten silicon, some of the disadvantages described can be overcome. However, the disadvantage remains that blanks having plane supporting surfaces can in many cases be removed only with difficulty from a plane porous SiC plate, after the silicization has been completed.

Furthermore, a plate-shaped substrate also has the disadvantage that the silicized molding sticks to it by its plane supporting surface and is therefore difficult to remove.

German Offenlegungsschrift 2,910,628 has disclosed a process, in which a first annular blank of 70 to 95% of silicon carbide, the remainder being carbon, is silicized in contact with a second annular pressing of 87 to 97% of silicon, the remainder being carbon. On heating, the second pressing is converted into a highly porous, fragile silicon carbide matrix which can readily transport the excess silicon into the first silicon carbide/carbon blank. A disadvantage is that each fragile matrix can be used only once and must then be removed. It is an advantage, however, that substrate and molding are mutually matched geometrically.

SUMMARY OF THE INVENTION

It was therefore the object to provide a process in which, after the infiltration process, ready detachment of the moldings is possible, without the latter being damaged by flaking, and the infiltration aid being usable repeatedly. The invention is based on the realization that the contact surfaces between the blank to be silicized and the carrier, i.e. the infiltration aid, should be as small as possible.

In accordance with this object, there is provided a process for silicizing a porous molding of silicon carbide/carbon, in which a mixture of silicon carbide powder, organic binder and, if appropriate, carbon is molded to give a green compact, the binder of the green compact is removed by carbonization at about 1000° C. in a non-oxidizing atmosphere so as to form a blank and the resulting blank is silicized by the action of molten silicon, while the resulting blank rests on a porous SiSiC carrier, whose lower part is in contact with the molten silicon, and SiSiC carrier and resulting molding being cooled after completion of the silicization, wherein the carrier is one of a close packing of porous SiSiC rings which are arranged mutually parallel and perpendicularly on a graphite firing plate which is charged with silicon and is impermeable to molten silicon, or the blank has a plane outer surface and the carrier is plane but for containing a plurality of recesses, or the blank is cylindrical and the carrier has a straight channel with an angular cross-section and recesses into which the cylindrical blank to be silicized is placed and the carrier has downward protruding side walls, whose undersides are in contact with the molten silicon.

In accordance with a first aspect of the present invention, a process for silicizing porous moldings of silicon carbide/carbon, in which a mixture of silicon carbide powder, organic binder and, if appropriate, carbon is molded to give a green compact, the binder of the green compact is removed by carbonization at about 1000° C. in a non-oxidizing atmosphere so as to form a blank and the resulting blank is silicized by the action of molten silicon, preferably at temperatures of at least 1400° C., while the resulting blank rests on a porous SiSiC carrier, whose lower part is in contact with the molten silicon, the SiSiC carrier and resulting molding being cooled after completion of the silicization, wherein the carrier is a close packing of porous SiSiC rings which are arranged mutually parallel and perpendicularly on a graphite firing plate which is charged with silicon and is impermeable to molten silicon.

In accordance with a second aspect of the present invention, there is provided a process for silicizing porous moldings of silicon carbide/carbon having at least one plane outer surface, in which process a mixture of silicon carbide powder, organic binder and, if appropriate, carbon is molded to give a green compact, the binder of the green compact is removed by carbonization at about 1000° C. in a non-oxidizing atmosphere so as to form a blank and the resulting blank is silicized by the action of molten silicon, preferably at temperatures of at least 1400° C., while the resulting blank rests with a plane outer surface on a supporting surface of a porous SiSiC carrier, whose lower part is in contact with the molten silicon, the SiSiC carrier and resulting molding being cooled after completion of the silicization, wherein the supporting surface of the carrier is plane but for containing a plurality of recesses.

In accordance with another aspect of the present invention, there is provided a process for silicizing porous elongate cylindrical moldings of silicon carbide/carbon, in which a mixture of silicon carbide powder, organic binder and, if appropriate, carbon is molded to give a cylindrical green compact, the binder of the green compact is removed by carbonization at about 1000° C. in a non-oxidizing atmosphere resulting in a cylindrical blank and the resulting blank is silicized by the action of molten elemental silicon at temperatures of at least 1400° C., the blank resting during silicizing on a porous SiSiC carrier, whose lower part is in contact with molten silicon, and the SiSiC carrier and blank are cooled after completion of the silicization, wherein the SiSiC carrier has a straight channel with an angular cross-section and recesses, into which the blank to be silicized is placed, and the SiSiC carrier has downward-protruding side walls, whose undersides are in contact with the molten silicon. The cylindrical blank can be rod-shaped or tubular.

Further objects, features and advantages of the present invention will become apparent from the detailed description of preferred embodiments that follows.

BRIEF DESCRIPTION OF THE DRAWINGS

FIGS. 1a and 1b illustrate a prior art process according to EP-134,254.

FIGS. 2-3 illustrate SiSiC carriers in the form of a close packing of rings according to the first embodiment of the present invention.

DETAILED DESCRIPTION OF THE PREFERRED EMBODIMENTS

In the present invention, the word silicize means that molten silicon infiltrates the blank, and carbon is converted to SIC. The word silicizing is equivalent to infiltrating or siliconizing used in the art. The molten silicon infiltrates the blank, and react with carbon present in the blank to form SiC.

In the first embodiment of the present invention, the carrier is a close packing of porous SiSiC rings. A plurality of rings can carry a single blank. If the molding has at least one plane outer surface, with which it rests on the rings, it is advantageous if the rings have the same height. The common contact surface between carrier rings and silicized blank placed thereon (and hence the difficulties in removal of the blank after the silicization) can be reduced by rounding the top surfaces of the rings.

It is possible for the rings to be closed at the bottom and that the interior of the containers thus formed is likewise filled with silicon. If the blank has a spherical shape, the sphere diameter should be greater than the internal diameter of the ring, and one spherical blank should in each case be in contact with one carrier ring. In order to accelerate the infiltration of the spherical blanks, rings can be used which are chamfered on the inside, so that the spheres are in areal contact with the carrier rings. FIGS. 2 and 3 show two close packings of individual tubes (1) which are set up on a graphite plate (15).

Figure 6A:
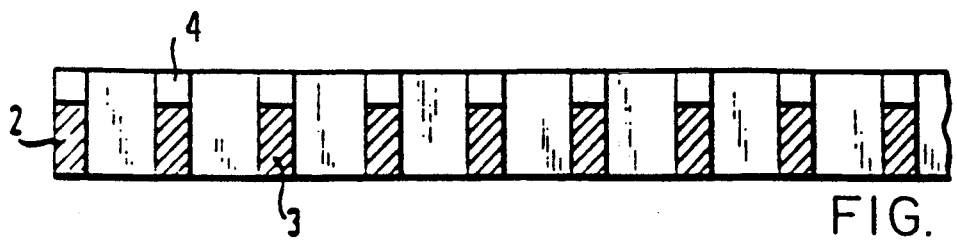
Figure 6B:
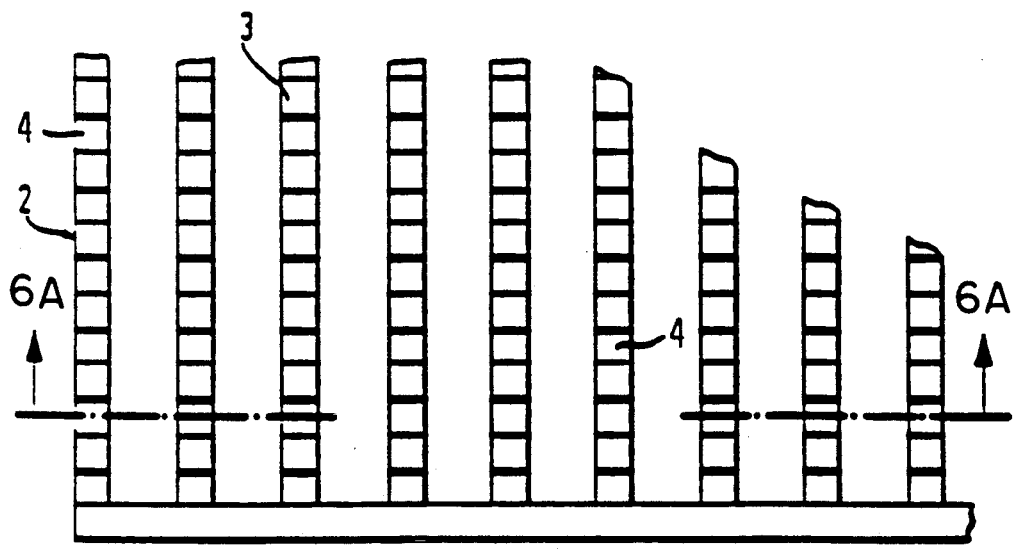
Figure 6C:
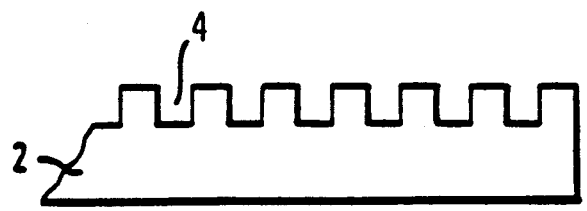
Figure 7A:
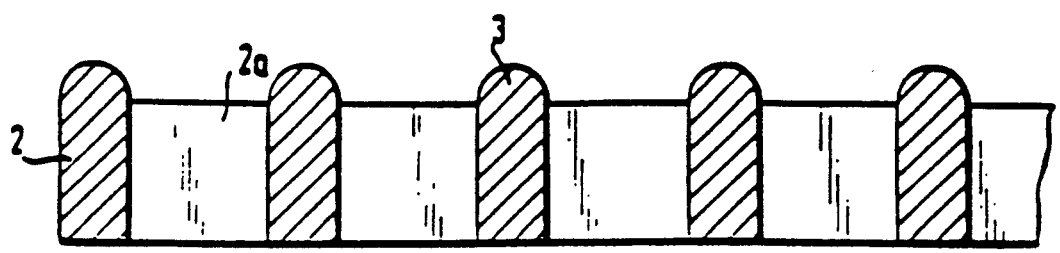
Figure 7B:
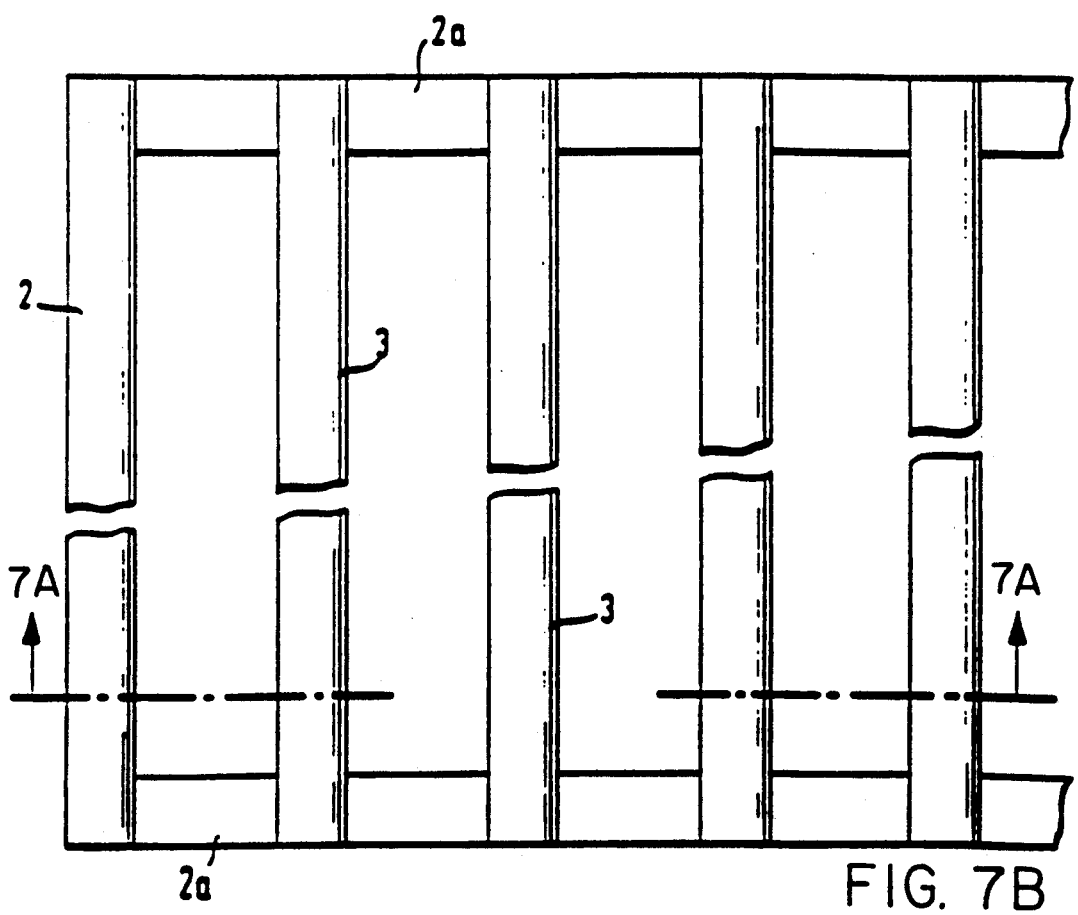

The rate at which the silicon migrates through the SiSiC rings can be controlled by the number of pores and the magnitude of the pore diameter in the aid. This effect has already been described (for the silicization of a green compact) in Special Ceramics 5, 1970, in connection with FIG. 6.

A reduction in the pore diameter brakes the flow of silicon, and an increase accelerates the latter. The magnitude of the pore radii depends on the silicon carbide grain sizes employed in the preparation of the firing aids (rings). Coarse grain sizes (e.g. F 230 having a mean grain size of 53.0±3.0 microns) give small pores. By means of a suitable selection of the silicon carbide grain sizes, the pore radii distributions can thus be adjusted within a wide range, if required.

According to the second embodiment of the invention, the porous SiSiC carrier is in the form of a grate which, in addition to outer walls, also has at least one inner wall, the outer walls and inner walls ending at the top at the same height (i.e. they are suitable for depositing an article having a plane outer surface) and at least the outer walls being in contact with the molten silicon.

The carrier can also assume the form of a container, i.e. it can be suitable for receiving molten silicon at the bottom. It is, however, also possible to deposit the grate on a plate known per se, on which lumpy silicon will also be fused later. To increase the silicon flow, the inner walls can also be brought so far down that they are (like the outer walls) in contact with the molten silicon.

The grate forming the deposition surface has preferably a plurality of parallel inner walls. It is also possible for two systems of parallel inner walls to be present, which intersect and, in particular, are arranged at right angles to one another.

If the outer surface of the blank to be silicized is completely plane, i.e. has neither ribs nor recesses, the common contact surface can be reduced if the inner walls of the grate-shaped carrier have recesses at the upper edge. Preferably, the recesses at the upper edge are rectangular, so that the upper side of the inner walls is given the shape of a crenelated wall. It is also possible at the same time to shape the outer walls correspondingly.

The common contact surface between the carrier and the deposited silicized blank (and hence the difficulties in removing the blank after silicizing) can also be reduced by rounding the upper ends of the grate walls.

Figure 4A:
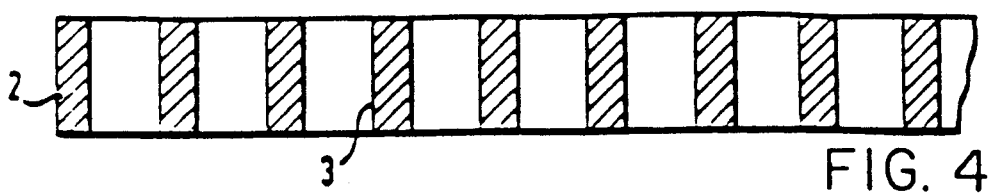
FIGS. 4(a,b), 5(a,b), 6(a,b,c) and 7(a,b) illustrate SiSiC carriers in the form of a grate.
Figure 4B:
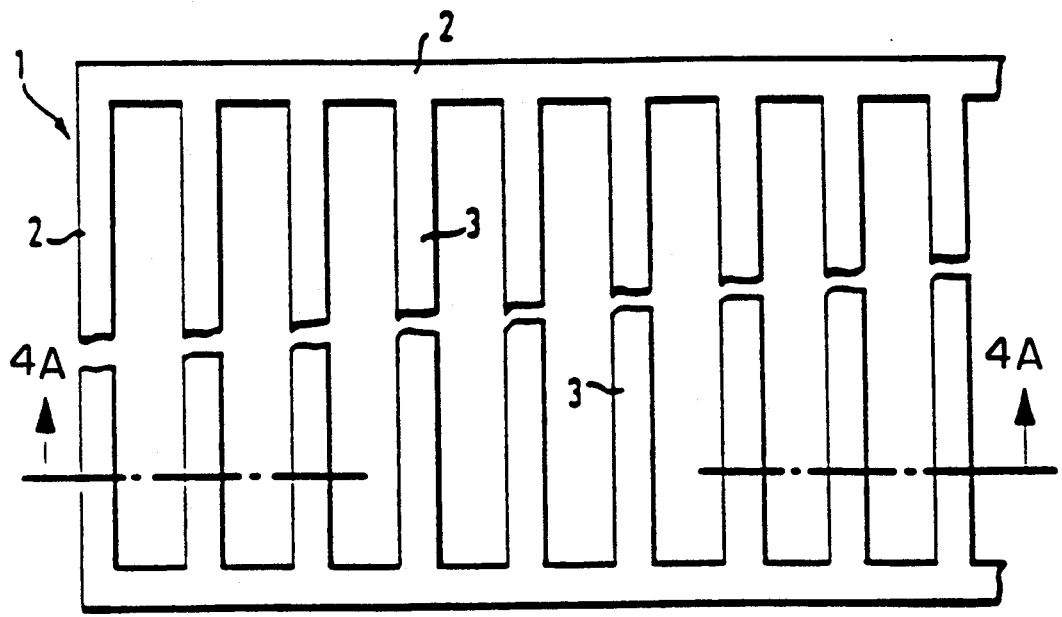
Figure 5A:
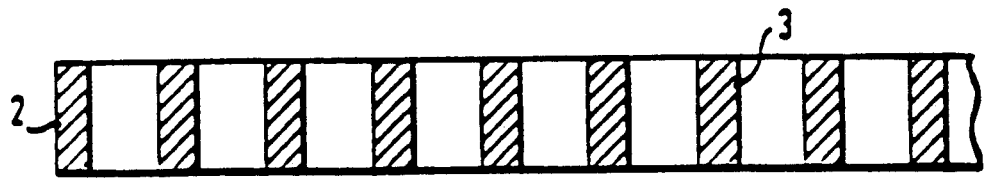
Figure 5B:
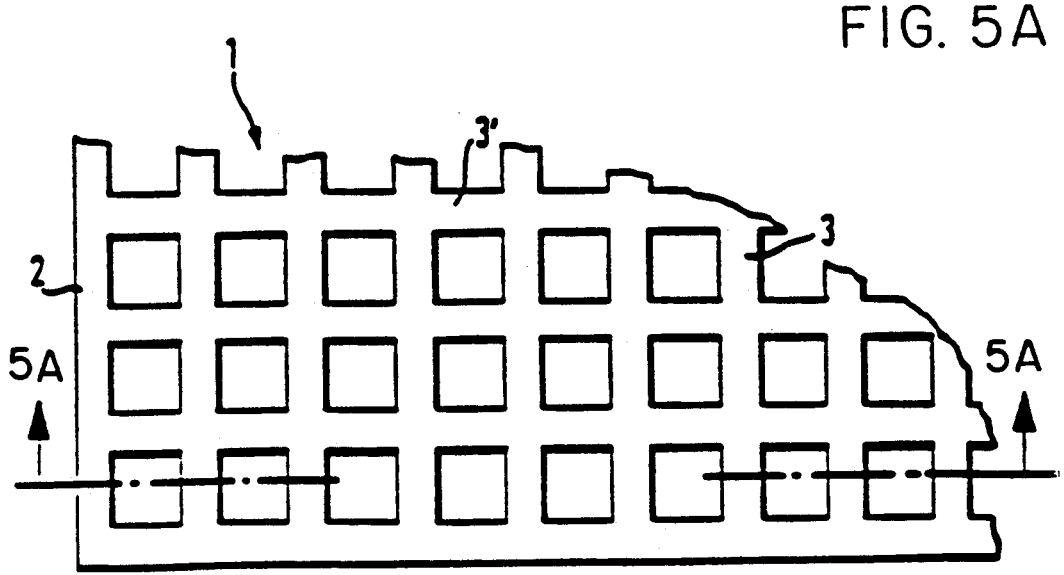

FIGS. 4 to 7 show SiSiC carriers 11 in the form of a grate (1) which, in addition to outer walls 2, also contains at least one inner wall 3. The inner walls of FIGS. 4 to 7 show a plurality of parallel inner walls. The inner walls of FIG. 5 show two systems of parallel inner walls (3 and 3') which are arranged at right angles to one another. In FIG. 6a, the inner walls and some of the outer walls have rectangular recesses (4) at the upper edge.

According to another embodiment of the process according to the invention, the porous SiSiC carrier is in the form of a can which stands on its side walls, the side walls being in contact with the molten silicon at the bottom, and the outer bottom of the can pointing upwards and being provided with upward-protruding ribs.

Preferably, the can is circular and the ribs are arranged concentrically. However, the bottom can also be annular, i.e. it can have a concentrically arranged recess. Here again, the ribs should be arranged concentrically. Using such an SiSiC carrier, blanks can preferably be silicized which have a T-shaped cross-section. In this case, the central part of the blank is received by the central perforation of the carrier and the blank rests on its "bar" with the T-shaped cross-section.

As in the first embodiment, the rate at which the silicon migrates through the infiltration aid can be controlled by the number of pores and the magnitude of the pore diameter in the aid. This effect has already been described (for the silicization of the green compact) in Special Ceramics 5, 1970, in connection with FIG. 6.

Figure 8A:
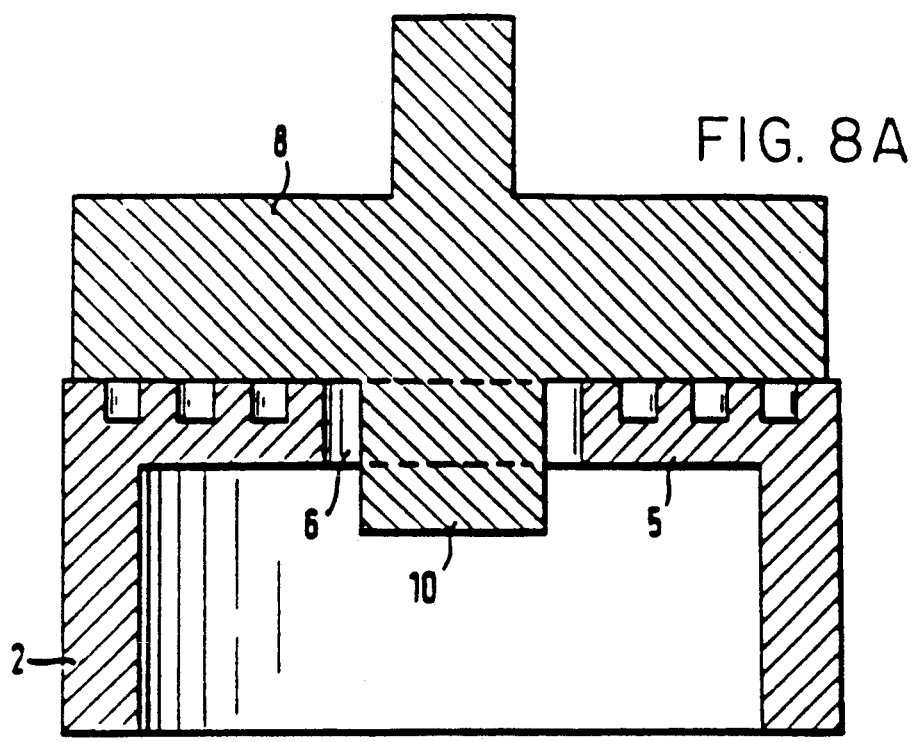
FIGS. 8(a,b) illustrate SiSiC carriers in the form of a can.
Figure 8B:
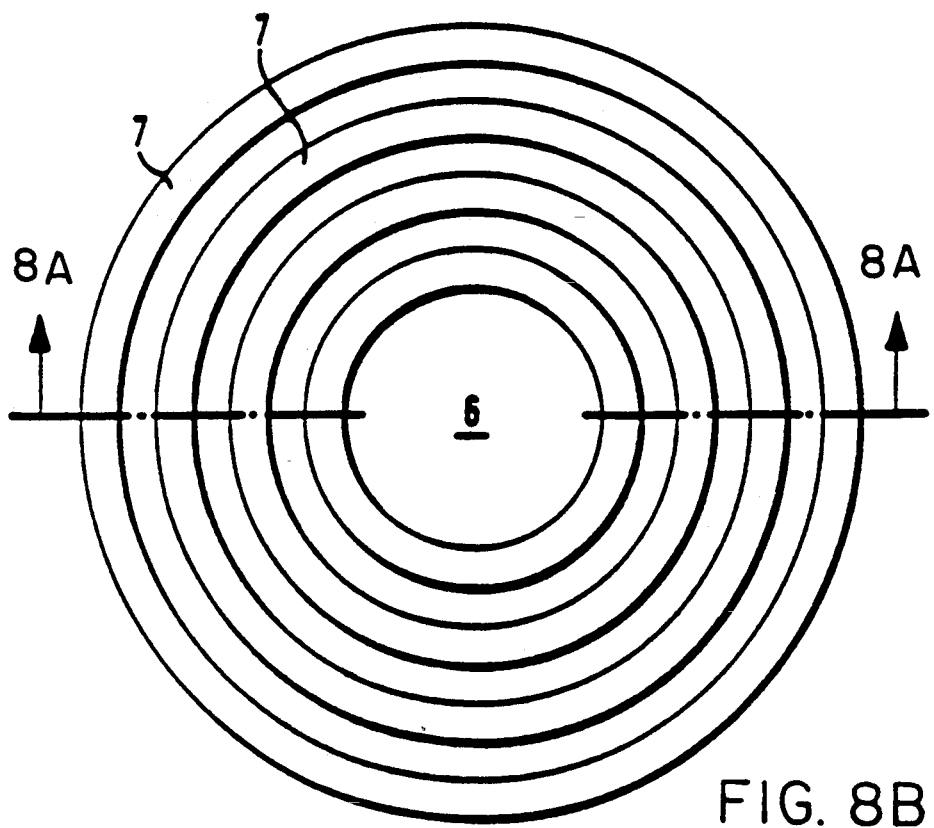

In FIG. 8, an SiSiC carrier 12 is shown which has the shape of a circular can which stands on its circular side wall 2, the bottom of the can (5) being annular and having a concentrically arranged recess 6. The can also has, in the upward-pointing outer bottom, a plurality of ribs 7 which are likewise arranged concentrically. The side wall of the can is (not shown) at the bottom in contact with the molten silicon. In the figure, a blank 8 having an approximately T-shaped cross-section is deposited on the carrier. The central part (10) of the blank is received by the central recess 6 in the carrier. The "bars" of the blank (8) having the T-shaped cross-section are supported on the ribs 9.

Figure 9A:
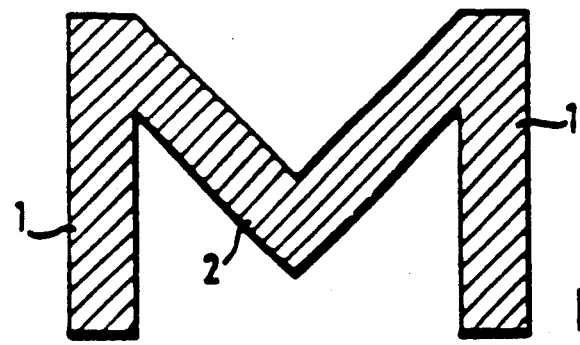
FIGS. 9a and 9b illustrate SiSiC carrier in the form of an M-shape.
Figure 9B:
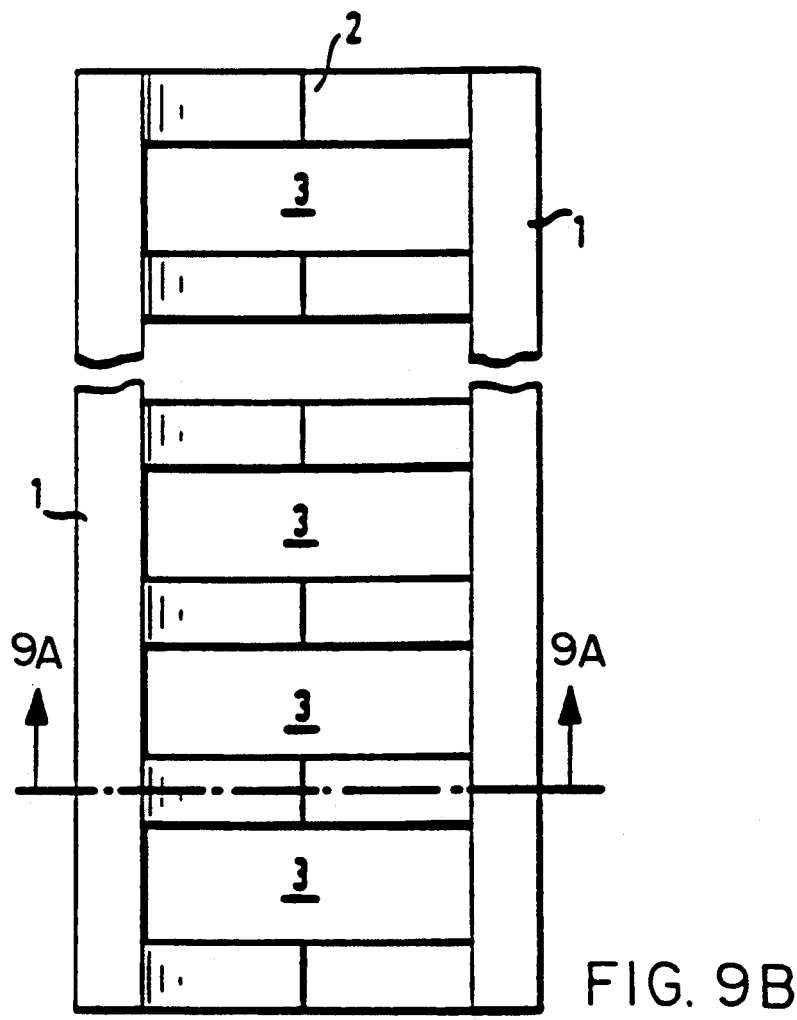

An SiSiC carrier which can be used according to the third embodiment of the invention is shown in FIG. 9. This is a prism of M-shaped cross-section. The arms 1 should, at their underside, dip into molten silicon (not drawn). The angle 2 serves to receive the blanks. FIG. 9a shows the section A-B of FIG. 9b. FIG. 9b shows a plan view of the carrier with the perforations 3.

As a first approximation, the quantity of the silicon used should just correspond to the quantity absorbed on silicizing. As described earlier, the rate at which the silicon migrates upwards through the M-shaped prism (=infiltration aid) can be controlled by the size and number of the pores filled with silicon. The lower the density of the infiltration aid, the greater is the surface area fraction of the silicon and hence the effective capillary area. The greater this area, the higher is also the migration rate. The arithmetical relationship between the density of the infiltration aid and the surface area fraction of the silicon is illustrated in the table which follows.

| Density of the infiltration aid g/cm$^3$ | Surface area fraction of the silicon or effective capillary area % |
|---|---|
| 2.50 | 80.7 |
| 2.60 | 69.3 |
| 2.70 | 58.0 |
| 2.80 | 46.6 |
| 2.90 | 35.2 |
| 3.00 | 23.9 |
| 3.10 | 12.5 |

What is claimed is:

1. A process for silicizing a porous molding of silicon carbide/carbon, in which a mixture of silicon carbide powder, organic binder and optionally carbon is molded to give a green compact, the binder of the green compact is removed by carbonization at about 1000° C. in a non-oxidizing atmosphere so as to form a blank containing carbon and the resulting blank is silicized by the action of molten silicon, while the resulting blank rests on a porous SiSiC carrier, whose lower part is in contact with the molten silicon, and SiSiC carrier and resulting molding being cooled after completion of the silicization, wherein the improvement comprises using one of the following as said porous SiSiC carrier:

the carrier is a close packing of porous SiSiC rings which are arranged mutually parallel and perpendicularly on a graphite firing plate which is charged with silicon and is impermeable to molten silicon, or the blank has a plane outer surface and the carrier is plane but for containing a plurality of recesses, or the blank is cylindrical and the carrier has a straight channel with an angular cross-section and recesses into which the cylindrical blank to be silicized is placed and the carrier has downward protruding side walls, whose undersides are in contact with the molten silicon.

2. A process as claimed in claim 1, wherein the carrier is said close packing of porous SiSiC rings.

3. The process as claimed in claim 2, wherein a plurality of rings carry one blank, the rings have the same height and the molded green compact has at least one plane outer surface, with which it rests on the rings.

4. The process as claimed in claim 2, wherein the ring surfaces are rounded at the top.

5. The process as claimed in claim 2, wherein the rings are closed at the bottom so as to form containers and the interior of the containers thus formed is likewise filled with silicon.

6. The process as claimed in claim 2, wherein the blank has a spherical shape, the sphere diameter is greater than the internal diameter of the ring, and each spherical blank is in contact with only one carrier ring.

7. The process as claimed in claim 6, wherein the rings are chamfered on the inside, so that the spherical blanks are in areal contact with the carrier rings.

8. The process as claimed in claim 3, wherein the ring surfaces are rounded at the top.

9. The process as claimed in claim 2, wherein a plurality of rings carry one blank.

10. The process as claimed in claim 2, wherein the blank has at least one plane outer surface which rests on the rings.

11. The process as claimed in claim 2, wherein the blank has a spherical shape.

12. The process as claimed in claim 11, wherein the rings are chamfered on the inside.

13. The process as claimed in claim 2, further comprising detaching the blank from the carrier after the cooling step.

14. The process as claimed in claim 2, wherein the green compact is formed from a mixture of silicon carbide powder and organic binder.

15. The process as claimed in claim 2, wherein the green compact is formed from a mixture of silicon carbide powder, organic binder, and carbon.

16. A process as claimed in claim 1 wherein said resulting blank is silicized by the action of molten silicon at temperatures of at least 1400° C., while the resulting blank rests with a plane outer surface on a supporting surface of a porous SiSiC carrier, whose lower part is in contact with the molten silicon, wherein the supporting surface of the carrier is plane but for containing a plurality of recesses.

17. The process as claimed in claim 16, wherein the carrier surface is in the form of a grate which, in addition to outer walls, also has at least one inner wall, the outer walls and inner walls end at the top at the same height and at least the outer walls are in contact with the molten silicon.

18. The process as claimed in claim 17, wherein the grate has a plurality of parallel inner walls.

19. The process as claimed in claim 18, wherein there are two systems of parallel inner walls, which are arranged at right angles to one another.

20. The process as claimed in claim 17, wherein the inner walls have recesses at the upper edge.

21. The process as claimed in claim 20, wherein the recesses at the upper edge are rectangular, so that the upper side of the inner walls is given the shape of a crenelated wall.

22. The process as claimed in claim 17, wherein the upper ends of the walls are rounded.

23. The process as claimed in claim 16, wherein the SiSiC carrier is in the form of a can which stands on its side walls, the side walls are in contact with the molten silicon at the bottom, and the outer bottom of the can points upwards and is provided with ribs.

24. The process as claimed in claim 23, wherein the can is circular and the ribs are arranged concentrically.

25. The process as claimed in claim 23, wherein the bottom of the can is annular and has a concentrically arranged perforation, and the ribs are arranged concentrically.

26. The process as claimed in claim 25, wherein a blank is silicized which has a T-shaped cross-section, with the central part located in the central perforation of the carrier.

27. The process as claimed in claim 16, wherein said carrier is in the form of a container suitable for receiving molten silicon at the bottom.

28. The process as claimed in claim 17, wherein said grate is deposited on a plate.

29. The process as claimed in claim 17, wherein the inner walls are in contact with the molten silicon.

30. The process as claimed in claim 21, wherein at least some of the outer walls have rectangular recesses.

31. The process as claimed in claim 16, wherein said molding is silicon carbide.

32. The process as claimed in claim 16, further comprising removing the blank from the carrier.

33. A process as claimed in claim 1, wherein the molding is elongated and cylindrical and the resulting cylindrical blank is silicized by the action of molten silicon at temperatures of at least 1400° C., wherein the SiSiC carrier has a straight channel with an angular cross-section and recesses, into which the cylindrical blank to be silicized is placed, and the SiSiC carrier has downward-protruding side walls, whose undersides are in contact with the molten silicon.

34. A process as clammed in claim 33, wherein the cylindrical blank to be silicized is a tube.

35. A process as claimed in claim 33, wherein the cylindrical molding is detached from the SiSiC carrier upon cooling.

36. A process as claimed in claim 33, wherein said cylindrical green compact is formed from silicon carbide powder and organic binder.

37. A process as claimed in claim 33, wherein said cylindrical molding is formed from silicon carbide powder, organic binder, and carbon.

38. A process as claimed in claim 33, wherein said carrier is a prism of M-shaped cross section.

39. A process as claimed in claim 33, consisting essentially of the recited steps.

* * * * *